(12) United States Patent
Fuji et al.

(10) Patent No.: US 6,602,320 B2
(45) Date of Patent: Aug. 5, 2003

(54) METHOD FOR PRODUCING REDUCED IRON

(75) Inventors: Kojiro Fuji, Osaka (JP); Hidetoshi Tanaka, Osaka (JP); Shoichi Kikuchi, Osaka (JP); Takaya Kitajima, Osaka (JP); Osamu Tsuchiya, Osaka (JP)

(73) Assignees: Kabushiki Kaisha Kobe Seiko Sho (Kobe Steel, Ltd.), Kobe (JP); Midrex International B.V., Zurich (CH)

( * ) Notice: Subject to any disclaimer, the term of this patent is extended or adjusted under 35 U.S.C. 154(b) by 0 days.

(21) Appl. No.: 09/828,950

(22) Filed: Apr. 10, 2001

(65) Prior Publication Data

US 2001/0037703 A1 Nov. 8, 2001

(30) Foreign Application Priority Data

Apr. 10, 2000 (JP) .......................... 2000-108589
Apr. 10, 2000 (JP) .......................... 2000-108590

(51) Int. Cl.⁷ .............................................. C21B 13/08
(52) U.S. Cl. ............................ 75/484; 75/500; 75/504
(58) Field of Search .......................... 75/484, 500, 504

(56) References Cited

U.S. PATENT DOCUMENTS

| | | | |
|---|---|---|---|
| 1,885,381 A | 11/1932 | Simpson | |
| 3,427,148 A | * 2/1969 | Peters | ........................ 75/504 |
| 3,443,931 A | 5/1969 | Beggs et al. | |
| 3,947,621 A | 3/1976 | Collin et al. | |
| 5,637,133 A | 6/1997 | Munnix et al. | |
| 5,782,957 A | 7/1998 | Rinker et al. | |
| 5,885,521 A | 3/1999 | Meissner et al. | |
| 5,989,019 A | 11/1999 | Nishimura et al. | |
| 6,036,744 A | * 3/2000 | Negami et al. | ............... 75/503 |
| 6,063,156 A | 5/2000 | Negami et al. | |
| 6,126,718 A | 10/2000 | Sawa et al. | |
| 6,129,777 A | 10/2000 | Fuji et al. | |
| 6,135,766 A | 10/2000 | Takeda et al. | |
| 6,146,441 A | * 11/2000 | Innes | ........................ 75/500 |
| 6,149,709 A | 11/2000 | Uragami et al. | |
| 6,152,983 A | 11/2000 | Kamijo et al. | ................ 75/504 |
| 6,241,803 B1 | 6/2001 | Fuji | |
| 6,251,161 B1 | 6/2001 | Tateishi et al. | |
| 6,254,665 B1 | 7/2001 | Matsushita et al. | |
| 6,258,149 B1 | 7/2001 | Sugiyama et al. | |

FOREIGN PATENT DOCUMENTS

| | | |
|---|---|---|
| EP | 0 044 669 | 1/1982 |
| EP | 0 916 742 | 5/1999 |
| EP | 0 947 586 | 10/1999 |
| EP | 0 952 230 | 10/1999 |
| EP | 0 969 105 | 1/2000 |
| EP | 1 026 265 | 8/2000 |
| JP | 10-30106 | 2/1998 |
| JP | 10-147806 | 6/1998 |
| JP | 10-306304 | 11/1998 |
| JP | 11-106812 | 4/1999 |
| JP | 11-335712 | 12/1999 |
| JP | 11-337264 | 12/1999 |
| JP | 2000-45008 | 2/2000 |
| WO | WO 97/06281 | 2/1997 |
| WO | WO 99/16913 | 4/1999 |
| WO | WO 00/29628 | 5/2000 |

* cited by examiner

*Primary Examiner*—Melvyn Andrews
(74) *Attorney, Agent, or Firm*—Oblon, Spivak, McClelland, Maier & Neustadt, P.C.

(57) ABSTRACT

A method for producing reduced iron comprises agglomerating a raw material mixture containing a carbonaceous reducing agent and an iron oxide-containing material into small agglomerates, heating the agglomerate within a heat reduction furnace, thereby solid reducing the iron oxide in the agglomerate to produce solid reduced iron, or further heating the solid reduced iron, melting the metallic iron produced by the reduction, and coagulating the molten metallic iron while separating the slag component contained in the small agglomerates to provide granular metallic iron, which is characterized by using a agglomerate having a particle size of 10 mm or less or 3–7 mm, preferably less than 6 mm, more preferably 3 mm or more and less than 6 mm as the small agglomerates.

31 Claims, 6 Drawing Sheets

METALLIC IRON   SLAG

FIG. 9

| SMALL AGGLOMERATE PARTICLE SIZE | APPARENT DENSITY OF GRANULAR METALLIC IRON | YIELD OF Fe |
|---|---|---|
| LESS THAN 1.0 mm | 7.56 g/cm³ | 73.8 % |
| 1.0 – 3.35 mm | 6.87 g/cm³ | 83.0 % |
| 3.35 – 5.6 mm | 7.37 g/cm³ | 87.2 % |
| 5.6 – 6.7 mm | 7.35 g/cm³ | 87.4 % |
| 18.5 mm | 7.38 g/cm³ | 89.7 % |

METHOD FOR PRODUCING REDUCED IRON

BACKGROUND OF THE INVENTION

1. Field of the Invention

This invention relates to a method for producing reduced iron by heat-reducing an iron oxide such as iron ore with a carbonaceous reducing agent such as coke to obtain solid reduced iron, or further heating it, thereby separating a slag forming component as slag from the metallic iron to obtain granular metallic iron.

2. Description of the Background

As methods for producing reduced iron similar to this invention, it is known to pelletize raw material powders containing an iron oxide source such as iron ore and coke, and charge the raw material agglomerate into a heat reduction furnace as it is in an undried state to heat-reduce the green pellets, thereby successively performing the drying and heat reduction to produce reduced iron. Although this method has the advantage that the equipment or time required for drying the raw material agglomerates can be omitted, it requires a preheating zone serving also as drying zone before the heat reduction area, resulting in the inevitable enlargement of the whole furnace. It further requires the preparation of a shielding member such as curtain wall in order to obstruct the flow of a high-temperature gas from the heat reduction zone toward the preheating zone, and the structure of the furnace is consequently complicated, leading to the problem of an increase in equipment cost.

It is also known to enhance the heating efficiency by shaping the raw material layer charged on the hearth into ridges to extend the surface area of the raw material layer. In this method, however, the rate of heat transfer of burner heat or radiation heat into pellets is low even in raw material pellets having middle to large particle sizes of 10–20 mm, the pellets are barely stacked in several layers for all the formation of ridges, and a sufficient heat transfer effect cannot be necessarily obtained. It is further known to enhance the heating efficiency by plowing up the ridges in the middle of the heat reduction. However, the plowing up of the laminated part of the middle to large particle size pellets causes the breakage of the pellets, resulting in a reduction in yield of reduced iron.

Further, it is also proposed to supply the raw material powders onto the hearth while forming irregularities. However, the heat transfer property or reduction reactivity of this method is rather inferior, compared with the use of the agglomerate because the maximum accumulation thickness of the raw material is large, and the iron oxide source and the carbonaceous material of the raw material powders are only mixed together but not so closely in contact to each other.

In these methods, the raw material mixture is generally molded into a agglomerate having a diameter of about 10 mm or more, and it is supplied onto the hearth of a heat reduction furnace and heat-reduced. Since the raw material agglomerate having such a large diameter is apt to rupture by the influence of the moisture or volatile component contained therein when exposed to a high temperature of about 1300° C. or higher for efficiently progressing the reduction reaction. In most cases, therefore, the raw material agglomerate is preliminarily heated and then charged into the heat reduction furnace.

Further, the large size raw material agglomerate is generally difficult to pelletize, resulting in not only an increase in the cost required for pelletizing equipment or drying equipment but also an increase in the production cost. A binder is used in order to stably retain the shape after drying. However, an excessively large mixing quantity of the binder tends to hinder the uniform dispersion of the iron oxide source and carbonaceous material in the agglomerate and also causes the fear of affecting the efficiency of the heat reduction reaction. It is also proposed to omit the drying and supply the agglomerate to the heat reduction furnace in a green pellet state. However, this method cannot be said to be practically applicable in industrial scale because the green pellet is not only low in strength but also apt to cause a clogging by the mutual adhesion of the pellets or the adhesion to the hopper of a feeder with poor handling property.

The reduced iron obtained by the method as described above has a low Fe purity because a large quantity of the slag component included as gangue component in the raw material iron ore is contained therein, and requires the process for removing the slag component in the following refining treatment process. Further, the reduced iron obtained by this method is lacking in handling property in the merchandising as iron source because it is spongy and easy to break. To improve such a disadvantage, the spongy reduced iron must be worked into a briquette-like compact, which requires an extra apparatus.

Therefore, it is proposed to melt the metallic iron produced successively to the heat reduction of the reduced iron and coagulate the molten metallic iron while separating from the by-produced slag component to obtain granular metallic iron. However, a sufficient examination has not be necessarily performed in this method for how efficiently granular metallic iron is produced, taking into account the size or the like of the raw material agglomerate.

SUMMARY OF THE INVENTION

This invention has an object to provide a method capable of stably and efficiently performing the agglomerating of a raw material, the drying and heat reduction, and further the melting and coagulating by properly setting, particularly, the size or number of layers of raw material small agglomerates in the production of solid reduced iron (granular metallic iron, reduced iron containing slag) from a raw material containing an iron oxide source and a carbonaceous reducing agent.

Namely, a method for producing reduced iron according to this invention comprises agglomerating a raw material mixture containing a carbonaceous reducing agent and an iron oxide containing material into small agglomerates, charging the small agglomerates into a reduction furnace, and heating the small agglomerates in the reduction furnace, thereby solid reducing the iron oxide in the small agglomerates to produce solid reduced iron.

In the above method for producing reduced iron, the small agglomerates are mainly composed of those having particle sizes of less than 6 mm, or particle sizes of 3 mm or more and less than 6 mm, and the small agglomerates are charged in 2–5 layers depth.

In the above method for producing reduced iron, the small agglomerates are mainly composed of those having particle sizes of less than 3 mm, and the small agglomerates are charged onto the hearth of the reduction furnace in 3 layers depth or more.

In the above method for producing reduced iron, the small agglomerates are mainly composed of those having particle sizes of 3–7 mm, and the small agglomerates are charged onto the hearth of the reduction furnace so as to mutually overlap in a thickness of 10–30 mm.

In the above method for producing reduced iron, the small agglomerates are leveled so as to have 3–5 layers depth.

In the above method for producing reduced iron, the small agglomerates are charged into the reduction furnace without drying, the small agglomerates are charged onto the hearth after drying at least the surface thereof, mountain parts and valley parts are formed on the surface of the small mass layer charged on the hearth of the reduction furnace, the small agglomerates are charged after a powdery carbonaceous material is laid over the hearth of the reduction furnace, or the small agglomerates are charged onto the hearth with the carbonaceous material being adhered to the surface thereof.

According to this, the small agglomerates are used as the raw material, whereby the agglomerating of the raw material, the drying and heat reduction and further the melting can be stably and efficiently performed. The preferable particle size is 3–7 mm or less than 6 mm, but the particle sizes of the small agglomerates are more preferably set to 3 mm or more and less than 6 mm. In this case, the small agglomerates are charged on the hearth in a thickness of 10–30 mm or in 2–5 layers depth, preferably, 3–5 layers depth, whereby the productivity as product reduced iron can be sufficiently enhanced. Further, the particle sizes may be less than 3 mm. In this case, the small agglomerates are desirably charged in 3 layers depth or more in order to improve the productivity. When small agglomerates having such small particle sizes are used, the production of reduced iron can be efficiently performed under stable operability without causing the rupture or crush of the small agglomerates even if the small agglomerates are charged into the heat reduction furnace in an undried state without drying or in a semi-dried state.

The small agglomerates are charged into the heat reduction furnace with the carbonaceous powder being adhered to the surface thereof, whereby the erosion of the hearth refractory material by the molten slag produced in reduction process derivatively from the gangue component in the raw material can be suppressed, and the reoxidation of reduced iron in the last stage of reduction can be also preferably prevented. Further, when a small size raw material agglomerate having a high crushing strength, compared with a large size agglomerate, is used, the agglomerate can be placed on the hearth so as to have, for example, 3–5 layers depth and heat-reduced without stopping, whereby the productivity can be more enhanced. At this time, mountain parts and valley parts are irregularly formed (ex. convex and concave) on the surface of the small mass layer charged on the hearth, whereby the heat from above can be more efficiently transferred to each small mass on account of the enlargement of the effective heat transfer surface area of the small mass layer, and the heat transfer to the lower layer-side small agglomerates can be also hastened to further enhance the productivity.

It is also recommended to adapt the method of charging the small agglomerates onto the hearth after drying at least the surface thereof since the supply failure by the mutual adhesion of the small agglomerates in a hopper part in the charging of the small agglomerates to the furnace or the crushing of the agglomerates by the stacking load after charge can be further prevented.

This invention further involves a method for producing reduced iron comprising agglomerating small agglomerates of particle sizes of 10 mm or less containing a carbonaceous reducing agent and an iron oxide containing material, charging the small agglomerates into a reduction furnace so as to have the number of layers determined from operation conditions, for example, the number of layers (H) satisfying the following relation, and heating the small agglomerates in the reduction furnace, thereby solid reducing the iron oxide in the small agglomerates to produce solid reduced iron:

$$H = Z \times [X \times (G/P)]/[A \times \text{LOAD} \div T]$$

wherein H is the number of layers of the small agglomerates, X is the productivity (kg/min) of the heat reduction furnace, Z is a positive number ranging from 0.7 to 1.3, LOAD is the mass per unit area (kg/m$^2$) of the small agglomerates in the charging over the hearth in one layer, G/P is the mass ratio of the charging quantity of the small agglomerates to the reduced iron to be discharged, and A is the furnace floor area (m$^2$) for charging the small agglomerates, T represents the production time (min) in the productivity X.

In the above method for producing reduced iron, the particle sizes of the small agglomerates are 6–10 mm, the small agglomerates are charged onto the hearth of the reduction furnace in 1–3 layers depth, the particle sizes of the small agglomerates are homogenized within ±3 mm, and the surface temperature is raised to 1200° C. or higher in the time of ⅓ of the total reduction time after the small agglomerates are charged into the reduction furnace.

According to this, when the upper limit of particle size of the raw material agglomerate is set to 10 mm, the number of layers H of the raw material agglomerate charged on the hearth is specified so as to satisfy the relation of the above expression. In the range satisfying such a relational expression, the productivity of reduced iron can be significantly enhanced, compared with in the past even if the particle size of the raw material agglomerate is within the range of 6–10 mm. The raw material agglomerate desirably has a narrow particle size distribution, and those having particle sizes preferably within the range of ±3 mm, more preferably within the range of ±2 mm are used, whereby the operation stability and the productivity as reduced iron can be further enhanced. Further, the surface temperature of the raw material agglomerate is preferably raised to 1200° C. or higher in the time of ⅓ of the total reduction time after charged into the heating reduction furnace, whereby the reduction can be efficiently proceeded in a short time.

In the method for producing reduced iron according to this invention, the small agglomerates are preferably mainly composed of those having particle sizes of 3 mm or more and less than 6 mm, or 3–7 mm. In the heat reduction by use of such small agglomerates as the raw material, the small agglomerates are preferably charged onto the hearth of the reduction melting furnace so as to mutually overlap in a thickness of 10–30 mm (about 3–10 layers), whereby the productivity of granular metallic iron can be further enhanced. Further, mountain parts and valley parts are preferably formed on the surface of the small mass layer to irregularly charge the small agglomerates onto the hearth, whereby the heating efficiency can be enhanced by the extension of the heat transfer effective surface area, and the heating speed of the small agglomerates in the stacking lower layer part can be also enhanced to more efficiently perform the whole reduction and melting.

Further, when the method of charging the small agglomerates after laying a powdery carbonaceous material over the hearth, or charging the small agglomerates onto the hearth after adhering the carbonaceous powder to the surface thereof is adapted, the carbonaceous material is carburized to the metallic iron produced by reduction to lower its melting point, so that not only the melting of metallic iron can be more efficiently progressed, but also the adhesion to the hearth surface of the molten metallic iron produced by melting can be suppressed to promote the granulation of the molten metallic iron by coagulation. Further, the erosion of the hearth refractory material by the molten slag rich in FeO easily produced by the insufficient reduction in the stacking bottom layer part of the small agglomerates charged on the hearth can be also suppressed.

BRIEF DESCRIPTION OF THE DRAWINGS

FIG. 9 is a view showing the average value of apparent density of the granular metallic iron obtained in this invention and the Fe yield of granular metallic iron having a particle size of 3 mm or more.

DESCRIPTION OF THE PREFERRED EMBODIMENTS

Figure 1:
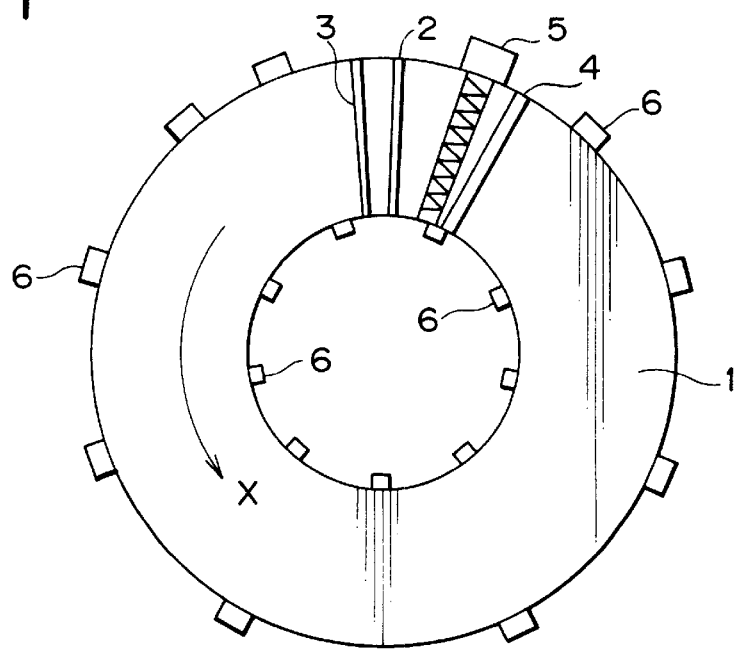
FIG. 1 is a view showing an example of a heat reduction apparatus used in this invention.

The method for producing reduced iron according to this invention is further described in detail.

In this invention, in the production of solid reduced iron by agglomerating a raw material containing an iron oxide source (hereinafter often referred to as iron ore or the like) such as iron ore, iron oxide or a partial reduced product thereof and a carbonaceous reducing agent (hereinafter often referred to as carbonaceous material) into small agglomerates and charging them in a reduction furnace (hereinafter often referred to as heat reduction furnace or reduction melting furnace) followed by heat reduction, or in the production of granular metallic iron by further heating the solid reduced iron to melt the metallic iron produced in the solid reduced iron and coagulating the molten metallic iron while separating the slag component contained in the solid reduced iron, small agglomerates (hereinafter often referred to as raw material agglomerate or small size agglomerate) having particle sizes of less than 6 mm or 10 mm or less are particularly used as the small agglomerates, whereby the pelletization can be facilitated to reduce the pelletizing equipment cost, and the improvement in pellet yield or the shortening of the pelletization time can be attained. Further, various advantages as described below can be enjoyed by the use of the small agglomerates. The following, the reduced iron mean granular metallic iron or solid reduced iron containing the slag.

Since the heat transfer property to the inner part can be enhanced, the reduction and melting can be efficiently progressed in a shorter time to enhance the productivity of reduced iron. The use of the small mass allows the reduction in mixing quantity of the binder, whereby the uniform dispersion of the iron oxide source and the carbonaceous material within the small agglomerates can be promoted, which is also effective for the improvement in reduction efficiency and melting rate. The use of the small agglomerates also allows the increase in individual crush strength, compared with the large size agglomerate, and the production yield of reduced iron can be improved since the collapse or powdering of the agglomerate in reduction can be particularly suppressed. Further, the stacking charge thickness onto the hearth part can be increased so as to be contributable to the improvement in productivity.

To effectively exhibit the effect by the use of the small size agglomerate, the particle size of the agglomerate is desirably set to 10 mm or less, 7 mm or less, preferably 6 mm or less, and more preferably less than 6 mm. The above effect can be hardly significantly exhibited in the large size agglomerate with a particle size exceeding it. However, a fine agglomerate with a particle size of less than 2 mm, particularly 1 mm or less not only is apt to clog in the screening by use of a sieve to deteriorate the handling property, but also causes a trouble such that the finally obtained reduced iron is also fine in diameter to complicate the subsequent handling. Therefore, the particle size is desirably set to preferably 2 mm, more preferably 3 mm or more, or 4 mm or more. All the agglomerates must not necessarily be within the above preferable range in the execution of this invention, and the above effect can be effectively exhibited even if a small quantity (preferably, about 40% or less by mass ratio, more preferably about 20% or less) of fine agglomerates slightly out of the above range are contained as long as those having suitable particle sizes of the above range occupy 60 mass % or more, preferably about 70 mass % or more of the whole.

The small size agglomerate (the compact of the small diameter.) referred to in this invention is the general term of the agglomerate, pellet, briquette and the like of a mixture containing the iron oxide source and the carbonaceous reducing agent, and it may be in forms of not only single body but also mixture, or contain a small quantity of broken pieces or powders broken in transfer process regardless of the name. For the production of the small size agglomerate, a general agglomerating method by use of pan pelletizing machine, disc pelletizing machine, drum pelletizing machine or the like can be adapted without remarkable limitation.

The iron oxide source forming the raw material of the agglomerate include mill scale, sludge and the like as well as iron ore, and it may contain, for example, blast furnace dust, electric furnace dust, mill dust and the like. The kind of the carbonaceous reducing agent (carbonaceous material) is not particularly limited, and charcoal powder is also usable in addition to the most general coal powder and coke powder. Examples of the binder to be mixed as occasion demands include bentonite, starch and the like, but it is never limited, of course, by these examples. Further, when a proper quantity of CaO source (quick lime, slaked lime, calcium carbonate or the like) is preferably included in the raw material mixture to regulate the basicity of the slag forming component, it works as a desulfurizing agent to fix S contained in the raw material mixture to the slag side as CaS, so that granular metallic iron with low S content can be obtained.

When such a small size agglomerate is used, not only the reduction of the agglomerate charged on the hearth of the heat reduction furnace in a single layer state can be efficiently executed, but also its excellent crush strength characteristic can be utilized to enhance the productivity per unit hearth by charging the agglomerate on the hearth in multilayer state. At this time, the layer thickness is preferably set within the range of 3–10 layers by the number of layers of small agglomerates or 10–30 mm by thickness. If it is less than 3 layers, the improvement effect of productivity by stacking charge is slightly insufficient, and if the stacking charge thickness is excessively increased exceeding 10 layers, the heating of the small agglomerates on the stacking lower layer side tends to be insufficient to deteriorate the efficiency of reduction and melting coagulation. The productivity per unit hearth area can be enhanced by charging the small agglomerates in 2–5 layers for a particle size of 3 mm or more and less than 6 mm and in 3 layers or more for a particle size less than 3 mm. However, since the excessive increase in stacking charge thickness causes the tendency of the heating of the small size agglomerate on the stacking lower layer side to be insufficient to deteriorate the efficiencies of reduction and melting coagulation, the number of layers is desirably controlled to about 10 layers (about 100 mm by thickness) or less when the particle size is less than 3 mm.

For the supply of the small size agglomerate onto the hearth surface, for example, a method of cutting it with a hopper, a vibration feeder, a drum feeder or the like followed by supplying by use of a guide gutter or pipe, an inclined plate or the like can be adapted.

When the small size agglomerate is charged in multilayer state, it is desirable to irregularly form (ex. convex and concave) mountain parts and valley parts of optional forms on the surface of stacking longitudinally (in the hearth longitudinal direction) or laterally (in the hearth lateral direction) to extend the heat transfer effective surface area, whereby the heating efficiency by burner heat or radiation heat from above can be enhanced. The formation of such irregularities on the surface of stacking can effectively enhance the heat transfer efficiency to the small size agglomerate of the stacking lower layer part. The preferable form, size or pitch of the irregularities is set within the range of 5–200 mm by height (the space from the mountain top to the valley bottom), preferably 10–100 mm or 5–30 mm, and more preferably 10–30 mm although it cannot be indiscriminately regulated because it is varied depending on the stacking thickness. The preferable pitch (the width between adjacent mountain top parts) is set within the range of preferably 10–100 mm, more preferably 10–70 mm. The irregularities can be formed, for example, by charging the agglomerate through a plurality of feed ports in the heart lateral direction while changing the charging quantity, by charging it through an irregular hopper provided extending in the hearth lateral direction while changing the charging quantity, or by tracing the surface with a surface shaping member having irregularities after charging it substantially horizontally to form irregularities, and these method can be optionally selected.

The small size agglomerate used in this invention can be supplied onto the hearth as it is in the undried state since it is individually relatively high in crush strength because of its small diameter as described before, hardly crushable by the stacking pressure even by the stacking charge, and quickly dryable by the initial heating because of its high heat transfer speed. However, in order to more surely prevent the breakage by the impact in charging or the stacking load, the charging is preferably performed after preliminarily drying at least the surface layer side of the small size agglomerate, whereby the clogging of a charging hopper by the adhesion of the small size agglomerate can be also prevented.

In the execution of this invention, if a method of charging the small agglomerates after laying the powdery carbonaceous material on the hearth, or charging the small agglomerate after adhering the carbonaceous powder to the surface thereof is adapted, production of FeO-containing molten slag that remarkably erodes the hearth refractory material can be prevented to extend the hearth life, since the carbonaceous powder enhances the reduction degree of the circumferential gas near the small size agglomerate to more efficiently promote the reduction, compensates the insufficient reduction of the lower layer side which is apt to occur in the stacking charge of the small size agglomerate to enhance the whole reduction rate, and acts on FeO which is apt to be produced by the insufficient reduction of the lower layer side to quickly reduce it. Further, the sprinkling adhesion of the carbonaceous powder to the surface of the small size agglomerate is particularly effective for the charging of the small size agglomerate in the undried state since the mutual adhesion of the agglomerates or the adhesion to the charging hopper can be prevented. The carbonaceous material preferably carburizes the solid reduced metallic iron to lower its melting point, promotes the melting and coagulation, and granulates the molten metallic iron while suppressing the adhesion to the hearth surface.

As the carbonaceous powder used in this invention, coal powder, coke powder, charcoal powder and the like are optionally selectively usable. The adhesion of the carbonaceous powder to the surface of the small size agglomerate can be performed by sprinkling, by dispersing the carbonaceous powder in a dispersion medium such as water followed by spraying, or the like. In order to more effectively exhibit the above effect, the powdery carbonaceous material to be laid on the hearth surface has a particle size of preferably 2 mm or less by average particle size, more preferably 1.5 mm or less. In the adhesion of the carbonaceous material to the surface of the small agglomerates, the average particle size is set to preferably 1 mm or less, more preferably about 0.3 mm or less.

The essential requirement to be added in the use of the small size agglomerate having a particle size of 10 mm or less, particularly 6–10 mm in this invention is the optimum number of layers (H) of the raw material agglomerate charged in layer, which is determined after taking into account the operation condition of the heat reduction furnace to be used. The reason to determine this is as follows.

As the production of reduced iron, the productivity per unit time (X: kg/min) (the amount of the reduced iron discharged per unit time from a furnace, or the amount of the reduced iron supplied to a melting portion from a reduction portion) of the heat reduction furnace is represented by the following expression when the hearth area (the hearth area for charging the small agglomerates from feeding portion to end of reduction portion, or the hearth area of the part for charging the raw material agglomerate: $m^2$) is (A), and the charging quantity (kg/min·$m^2$) of the raw material agglomerate per unit time and unit area is (B).

$X = A \times B$

However, the iron oxide in the raw material agglomerate is reduced to Fe by heat reduction, the carbonaceous material is decomposed, and a volatile component such as Zn or Pb is volatized and further scattered by powdering. Therefore, the above expression is corrected, adding the mass ratio (G/P) to the raw material agglomerate to be charged.

$X = A \times B / (G/P)$

The charging quantity (B) of the raw material agglomerate can be represented by the following expression when the mass per unit area (kg/m$^2$) of the raw material agglomerate in the charging over the hearth in one layer is (LOAD), the number of layers depth is (H), the production time (min) in the productivity (X) (retention time in a furnace, or retention time of a reduction portion) is (T). This is substituted for the above equation.

$$B = LOAD \times H \div T$$

$$X = [A \times LOAD][H \div T]/(G/P)$$

The above expression is then modified into the calculation expression of the number of layers (H).

$$H = [X \times (G/P)]/[A \times LOAD \div T]$$

Since the ideal charging quantity per unit area corresponds to the weight per unit area in the charging of the raw material agglomerate in one layer, and (G/P) is the mass ratio of (G: the raw material agglomerate/P: the product reduced iron [the reduced iron discharged from a furnace, or the reduced iron supplied to a melting portion from a reduction portion]), the ideal number of layers (H) can be determined from these values. However, the correction taking into account the production condition of the practical furnace is required since the heating condition or reductive atmospheric condition is actually rather dispersed depending on the characteristics of the heat reduction furnace. At the result of the confirmation of the dispersion of (H) in the practical furnace, the dispersion (Z) is within the range of ±30% or within the range of 0.7–1.3, and it was confirmed that the following expression is established as described before.

$$H = Z \times [X \times (G/P)]/[A \times LOAD \div T]$$

The method for producing reduced iron according to this invention is briefly described in reference to a concrete device for the production of reduced iron by solid reducing the small size agglomerate as the raw material.

FIG. 1 is a schematic plan view showing one example of a movable hearth type (rotary hearth type in this example) reduction furnace to which this invention is applied, and a cover part for covering the furnace body is omitted in the drawing. Denoted at 1 is a doughnut-shaped rotary hearth, 2 is a raw material charging part, 3 is a surface shaping member, 4 is a cooling part, 5 is a reduced iron discharging device, and 6 is a heating burner.

In the production of reduced iron by use of this device, a raw material agglomerate containing an iron oxide source and a carbonaceous material is charged onto the rotary hearth 1 through the raw material charging part 2 so as to have a proper thickness (number of layers). The charging of the raw material agglomerate is performed, for example, by cutting the raw material agglomerate with a hopper, a vibration feeder, a drum feeder or the like, and regulating the charging quantity by use of a guide pipe or inclined plate. The surface of the raw material charge layer is smoothly leveled by the surface shaping member 3 on the just downstream side of the raw material charging part 2. At this time, irregularities of proper height and pitch are preferably formed on the surface of the raw material charge layer by the surface shaping member 3 as described before, whereby the heat transfer efficiency by burner heat and radiation heat to the raw material agglomerate layer can be enhanced.

The charged raw material agglomerate is heated by the combustion heat and radiation heat by the burner 6 provided on the furnace wall part while moving in the arrowhead direction X by the rotation of the rotary hearth 1, and the reduction is progressed. For this heating, burner heating by use of heavy oil, pulverized coal or waste plastics as fuel, combustion type heating of effectively utilizing a combustible gas (CO or $H_2$) generated in the furnace by the reduction and burning it by supply of air or oxygen, and further heat accumulation type heating can be adapted independently or in a proper combination thereof. The $CO_2$ or combustion exhaust gas generated by reduction is extracted through a gas exhaust port not shown.

When the reduced product (solid reduced iron) after completion of reduction (metallization rate: about 90% or more) is discharged as product as it is, it is cooled in the cooling part 4 (for example, by use of a water cooling jacket provided on the hearth lower part or by spraying of cooling gas), and successively taken out of the furnace through the optional discharging device 5. The structure of the discharging device is not particularly limited, and a method using a screw or scraper, a discharging method by gas spray or suction, and the like can be optionally selectively adapted.

When the temperature in the heat reduction (solid reduction) is too high, more concretely, when the ambient temperature is higher than the melting point of the slag composition consisting of gangue component, unreduced iron oxide and the like in the raw material, the low-melting point slag is molten and reacted with the refractory material constituting the movable hearth to erode it, so that the smooth hearth cannot be kept. When a heat higher than it is required for the reduction of the iron oxide is applied in the reduction period, FeO that is the iron oxide in the small size agglomerate is molten before its reduction, and a so-called smelting reduction (the phenomenon that a reduction progresses in a molten state, which is different from solid reduction) that the molten FeO reacts with carbon (C) in the carbonaceous material is rapidly progressed. Although the metallic iron is produced also by the smelting reduction, the continuous operation as practical furnace is difficult because the FeO-containing slag with high fluidty property remarkably erodes the hearth refractory material when the smelting reduction occurs.

Although such a phenomenon is varied depending on the iron ore or carbonaceous material constituting the small size agglomerate, or further the composition of the slag forming component contained in the binder, the above undesirable smelting reduction reaction progresses regardless of the brand of raw material iron ore to remarkably erode the hearth refractory material when the ambient temperature in reduction exceeds about 1500° C. Therefore, the temperature of reduction is desirably controlled to 1500° C. or lower, more preferably about 1450° C. or lower. Since the progress of reduction is delayed when the heating temperature is too low, the heating temperature is desirably set to preferably 1200° C. or higher, more preferably 1300° C. or higher.

In order to progress the reduction of the raw material agglomerate charged into the furnace at an efficient reduction rate without causing any partial melting of the slag component contained in the agglomerate, the reduction is performed while keeping the furnace temperature within the range of 1200–1500° C., more preferably 1250–1450° C. and, more preferably, the temperature is desirably raised to 1200° C. in the time of about ⅓ of the total reduction necessary time in the furnace. According to such a condition set, the reduction can be, in general, substantially completed by heating of about 8 minutes to 13 minutes.

In the heat reduction furnace used for the execution of this invention, the burner heating is frequently adapted to heat the raw material agglomerate. In this case, since a large quantity of CO gas is generated by the reaction of the iron oxide source and carbonaceous material in the raw material agglomerate charged into the furnace in the initial stage of the reduction, the vicinity of the raw material agglomerate is retained in a highly reductive atmosphere by the shielding effect by the CO gas released from itself.

However, the self-shielding effect is deteriorated because the generation of the above CO gas is rapidly reduced from the latter half of the reduction to the last stage thereof, and the raw material agglomerate is apt to be influenced by the combustion exhaust gas ($CO_2$ or $H_2O$) generated by the burner heating, so that the reduced iron reduced with effort is liable to reoxidize. As a preferable means for efficiently progressing the reduction while suppressing such a reoxidation as much as possible, for example, the preliminary adhesion of the carbonaceous powder to the surface of the raw material agglomerate as described before is given. Namely, when the carbonaceous powder is adhered to the surface of the raw material agglomerate in this way, it is immediately reacted with the oxidizing gas ($CO_2$ or $H_2O$) generated by the burner combustion to change this gas to a reducing gas such as CO or $H_2$. Accordingly, the vicinity of the reduced product subjected to reduction can be kept in a highly reducing atmosphere to prevent the reoxidation of the reduced iron as much as possible. To more effectively exhibit such a preventing effect of reoxidation, it is desirable to adhere a fine carbonaceous powder of preferably 2 mm or less, particularly preferably 1.0 mm or less as the carbonaceous powder. The carbonaceous powder can be adhered, for example, by sprinkling on the surface of the raw material agglomerate laid in the undried state or spraying it by use of a dispersion medium such as water. Of course, the adhesion method is never limited by these methods. Such an adhesion of the carbonaceous powder to the raw material agglomerate surface brings about other preferable additive effects of the prevention of the mutual adhesion of the agglomerates or the adhesion thereof to the raw material charging hopper part in the charging of the raw material agglomerate in the undried state and the smooth charging of the raw material.

For the production of reduced iron that is granular metallic iron (hereinafter often referred to as granular metallic iron or metallic iron) by performing a reduction by use of the small agglomerates as the raw material followed by melting and coagulation, the method according to this invention is briefly described in reference to a concrete device.

Figure 6:
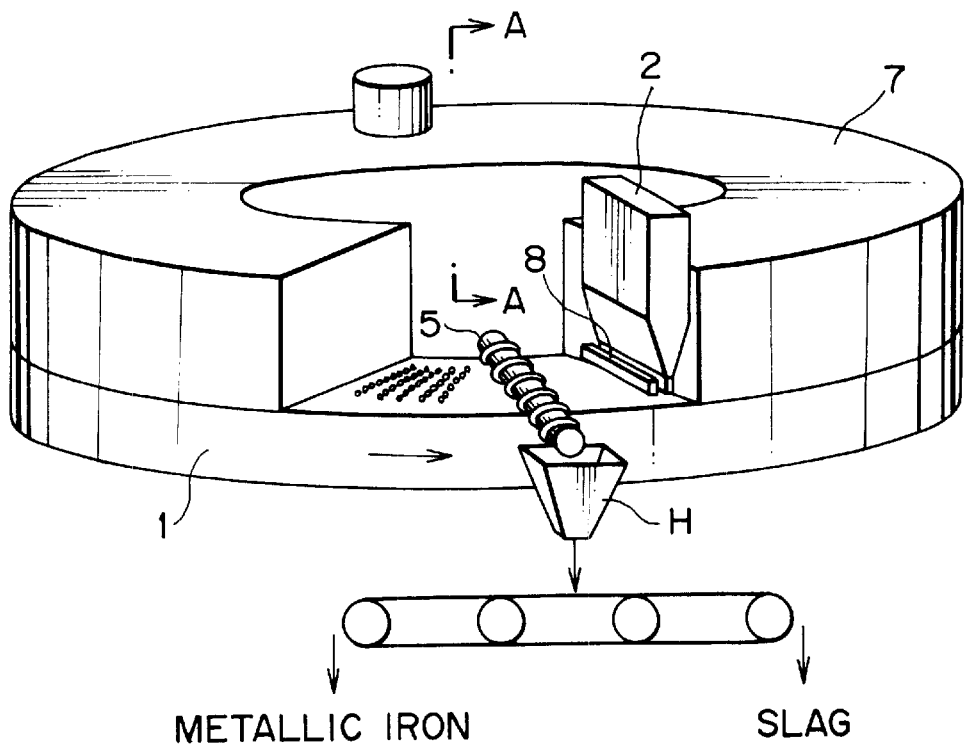
FIG. 6 is a view showing an example of a reduction melting apparatus used in this invention.
Figure 7:
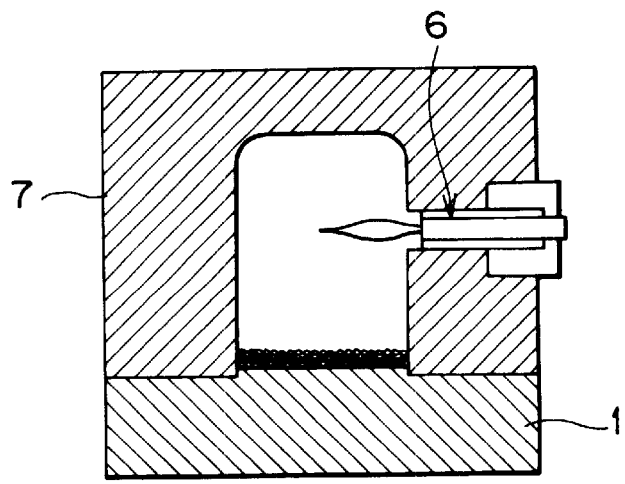
FIG. 7 is a sectional view taken along the line A—A of FIG. 6.
Figure 8:
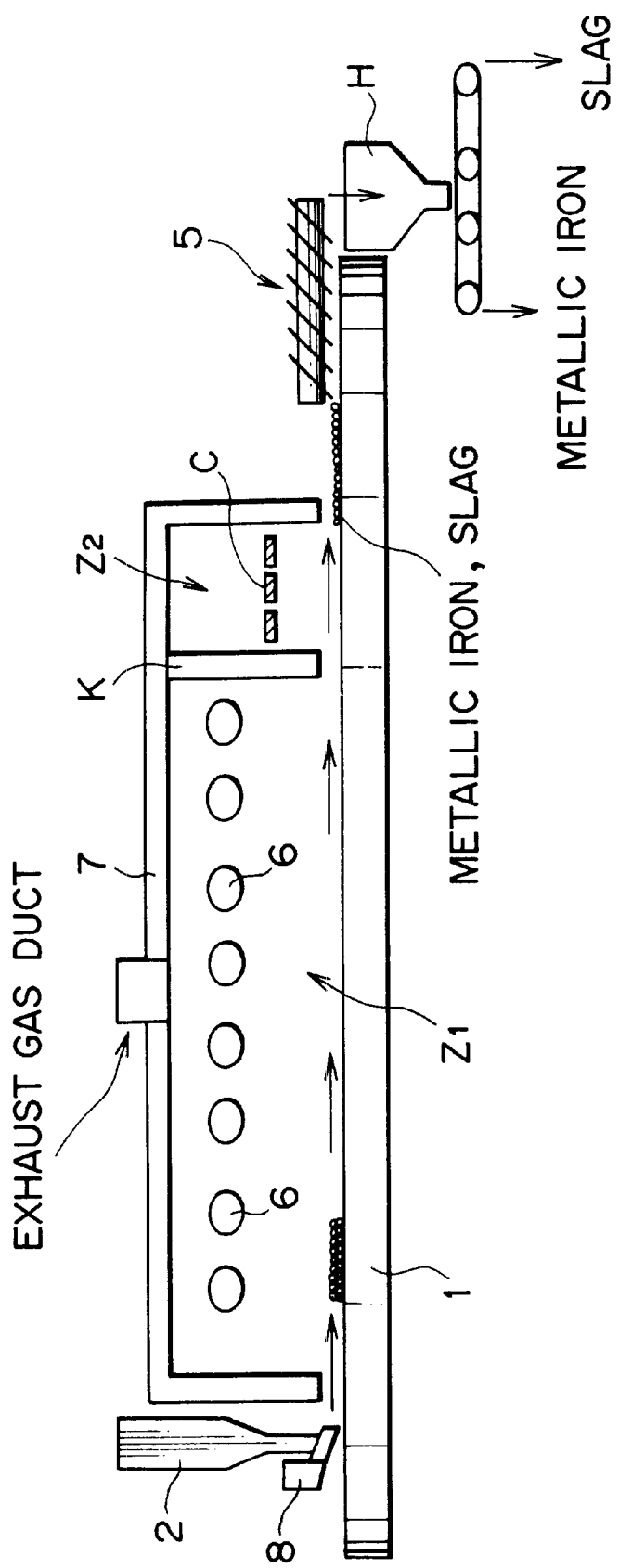
FIG. 8 is a sectional view showing the reduction melting apparatus of FIG. 6 developed in the rotating direction of a rotary hearth.

FIGS. 6–8 are schematic views showing one example of a movable bed type reduction melting furnace developed by the present inventors to which this invention is applied, and this furnace has a dome structure having a doughnut-shaped rotating movable bed. FIG. 6 is a schematic perspective view, FIG. 7 is a sectional view taken along the line A—A of FIG. 6, and FIG. 8 is a schematic sectional view of the reduction melting furnace developed in the rotating direction of the movable bed in FIG. 6 conveniently for understanding. In the drawings, denoted at 1 is a rotary hearth, 7 is a furnace body for covering the rotary hearth, and the rotary furnace 1 is constituted so as to be rotatable at a proper speed by a drive unit not shown.

The furnace body 7 has a plurality of combustion burners 6 in proper positions of the wall surface, and the combustion heat of the combustion burners 6 and the radiation heat thereof are transferred to the small agglomerates on the rotary hearth 1, whereby the heat reduction of the small agglomerates is performed. In the furnace body 7 shown in the drawings, which is one preferable example, the inner part of the furnace body 7 is partitioned into a reduction melting zone Z1 and a cooling zone Z2 by one partitioning wall K, a raw material and sub-raw material charging means 2 is arranged on the rotating directional uppermost stream side of the furnace body 7 in opposition to the rotary hearth 1, and a discharging means 5 is provided on the rotating directional lowermost stream side (also on the just upstream side of the charging means 2 because of the rotating structure).

The heat source of the heat reduction melting furnace includes a burner heating using gas, heavy oil, pulverized coal, or waste plastics as fuel and a combustion type of effectively utilizing the combustible gas generated in the furnace and burning it by supply of oxygen or air, and a heat accumulation type furnace is also usable. The produced granular metallic iron can be discharged by use of an optional discharging device such as screw or scraper or discharged by means of gas spray or suction.

In the operation of the reduction melting furnace, the rotary hearth 1 is rotated at a prescribed speed, the small agglomerates of the main raw material are supplied by use of the charging device 2 or a vibrating feeder 8 so as to have a proper thickness. In the charging, the small agglomerates can be charged in a single layer, but preferably charged on the hearth preferably in 3–10 layers, more preferably in 3–6 layers, or 10–30 mm by thickness, more preferably 20–30 mm, as described before, whereby the raw material charging quantity per unit hearth area can be increased to enhance the productivity.

In the charging of the small agglomerates in the laminated state, irregularities of optional sizes are preferably formed on the surface of the laminated body, whereby the heat transfer effective area of the laminated surface can be extended to more enhance the heating efficiency to the charged small agglomerates, and the heating efficiency to the small agglomerates on the stacking lower layer side can be also enhanced. The irregularities can be formed, as described before, by charging the small agglomerates through a plurality of feed ports in the hearth lateral direction while changing the charging quantity, charging through an irregular hopper provided extending in the hearth lateral direction while changing the charging thickness, or substantially horizontally charging the small agglomerates and tracing the surface by a surface shaping member having irregularities to form the irregularities.

The small agglomerates charged onto the hearth 1 are heated by the combustion heat and radiation heat by the combustion burners 6 in the process of moving in the reduction melting zone Z1, the iron oxide is reduced by the carbon monoxide generated by the mutual reaction of the iron oxide and carbonaceous reducing agent contained in the small agglomerates, and the produced metallic iron is further heated under carbon-rich atmosphere, whereby it is carburized, molten and coagulated while separated from the by-produced slag to form granular molten metallic iron, which is then cooled and solidified by an optional cooling means C in the cooling zone Z2 and successively raked out by the discharging means 5 provided on the downstream side. At this time, the by-produced slag is also discharged. These are separated into granular metal and the slag by an optional separating means (sieve or magnetic selecting device) after passed through a hopper H, and granular metallic iron with an iron purity of about 95% or more, more preferably about 98% or more and an extremely small slag content can be finally provided.

When the ambient temperature in the reduction (solid reduction) is too high in the above reduction and melting process, more concretely, when the ambient temperature is higher than the melting point of the slag composition consisting of the gangue component, unreduced iron oxide and the like in the raw material in a certain period of the reduction process, the low-melting point slag is molten and reacted with the refractory material constituting the movable hearth to erode it, so that the smooth hearth cannot be kept. When a heat higher than it is required for the reduction of the iron oxide is applied in the reduction period, FeO that is the iron oxide in the small agglomerates is molten before its reduction, and a so-called smelting reduction (the phenomenon that a reduction progresses in a molten state, which is different from solid reduction) that the molten FeO reacts with carbon (C) in the carbonaceous material is rapidly progressed. Although the metallic iron is produced also by the smelting reduction, the continuous operation as practical furnace is difficult because the FeO-containing slag having high fluidity property remarkably erodes the hearth refractory material when the smelting reduction occurs.

Such a phenomenon is varied depending on the iron ore or carbonaceous material constituting the small agglomerates, or further the composition of the slag forming component contained in the binder. However, the low-melting point slag as described above is leaked to erode the hearth refractory material when the ambient temperature in reduction exceeds about 1400° C., and the above undesirable smelting reduction reaction progresses to make the erosion of the hearth refractory material remarkable regardless of the brand of raw material iron ore when it exceeds about 1500° C. Therefore, the temperature of the reduction period is desirably controlled to 1500° C. or lower, more preferably about 1450° C. or lower. Since the reduction is hardly efficiently progressed when the temperature in the reduction period is too low, the temperature is desirably set to preferably 1200° C. or higher, more preferably 1300° C. or higher.

After the reduction, the ambient temperature is successively raised preferably by about 50–200° C. and set to 1350–1500° C. to melt the metallic iron produced by the reduction and coagulate the molten metallic iron. At this time, since the molten metallic iron is coagulated while eliminating the molten slag by-produced during it in the mutual coagulation and roughing, the coagulated metallic iron has high Fe purity and hardly contains the slag. This is cooled and solidified, and then separated into granular metallic iron and the slag by sieving or magnetic selection, whereby granular metallic iron with high Fe purity can be obtained.

The melting of the metallic iron produced by the reduction is progressed by raising the ambient temperature higher than the melting point of the metallic iron. At the start of melting, C or CO is preferably made present in the vicinity of the metallic iron, whereby the metallic iron is carburized to cause a melting point drop, so that the melting of the metallic iron can be progressed at a lower temperature within a shorter time. Namely, in order to rapidly progress the melting, it is preferable to leave a quantity sufficient for carburization of carbon in the particle after reduction. The residual carbon quantity can be regulated according to the mixing ratio of iron ore to carbonaceous material in the production of the small agglomerates of the raw material. On the basis of the experiments by the present inventors, it was confirmed that the initial carbonaceous material mixing quantity is set so that the residual carbon quantity (or excessive carbon quantity) in the solid reduced product is 1.5% or more in the state where the final reduction degree reaches about 100%, or the metallization degree reaches 100%, whereby the reduced iron can be rapidly carburized to lower the melting point, and also quickly molten within a temperature range of 1300–1500° C. If the residual carbon quantity is less than 1.5%, the melting point of the reduced iron is not sufficiently lowered because of the insufficient carbon quantity for carburization, and the temperature for heating and melting must be raised to 1500° C. or higher.

When the carburization is zero, or when the reduced iron is molten by heating to a temperature higher than the melting temperature of pure iron of 1537° C., the operation temperature is desirably controlled as low as possible in order to reduce the thermal load added to the hearth refractory material in the practical furnace. The operation temperature is desirably controlled to about 1500° C. or lower when the melting point of the by-produced slag is taken into consideration.

In order to progress the reduction of the raw material agglomerates charged into the furnace at an efficient reduction rate without causing any partial melting of the slag component contained in the raw material small agglomerates while keeping the solid state, it is desirable to adapt a two-step heating of performing the reduction while keeping the furnace temperature within the range of 1200–1500° C., more preferably 1200–1400° C., and successively raising the furnace temperature to 1350–1500° C. to reduce the partially left iron oxide and melt and coagulate the generated metallic iron. According to such a condition set, the granular metallic iron can be stably and efficiently produced, and the reduction and melting coagulation of the iron oxide can be generally completed in about 10 minutes to 13 minutes.

In the reduction melting furnace used in the execution of this invention, burner heating is frequently adapted to heat the raw material small agglomerates. In this case, since a large quantity of CO gas is generated by the reaction of the iron oxide source and carbonaceous material in the small agglomerates charged into the furnace in the reduction period, the vicinity of the raw material agglomerates are retained in a sufficient reducing atmosphere by the shielding effect of the CO gas released from itself.

However, the self-shielding effect is deteriorated because of the rapid reduction in generation of the above CO gas from the latter from half of the reduction period to the last stage thereof, and the small agglomerates are apt to be influenced by the combustion exhaust gas (oxidizing gas such as $CO_2$ or $H_2O$) generated by the burner heating, so that the metallic iron reduced with effort is liable to reoxidize. After the end of the reduction, the melting coagulation of the reduced iron is progressed by the melting point drop caused by the carburization of the reduced iron by the residual carbon in the small agglomerates. However, even in this stage, the reduced iron is also liable to reoxidize since the self-shielding effect is poor.

Accordingly, to efficiently progress the melting coagulation after the reduction while suppressing such a reoxidation as much as possible, it is desirable to properly control the ambient gas composition in the melting area. As the preferably means therefor, as described before, the powdery carbonaceous material can be charged onto the hearth prior to the charging of the small agglomerates to the hearth, or the carbonaceous powder can be preliminarily adhered to the surface of the small agglomerates. Namely, when the powdery carbonaceous material is preliminarily charged on the hearth surface, or the carbonaceous material is preliminarily adhered to the surface of the small agglomerates, the carbonaceous material immediately reacts with the oxidizing gas ($CO_2$ or $H_2O$) generated by burner combustion in the starting period of melting to change this gas to a reducing gas such as CO or $H_2$. Accordingly, the vicinity of the agglomerates subjected to reduction can be kept in a highly reducing atmosphere to prevent the reoxidation of metallic iron as much as possible. The carbonaceous reducing agent further can exhibit the effect of acting as the carburization source to the produced metallic iron to further shorten the time required for the carburization and melting of the metallic iron.

In order to effectively exhibit the above effect of the carbonaceous material, as the powdery carbonaceous material preliminarily charged onto the hearth, a fined matter having a particle size of preferably 3 mm or less, more preferably 2 mm or less, particularly preferably 0.3–1.5 mm is used as the powdery carbonaceous material to be preliminarily charged on to the hearth, and it is preferably charged in a thickness of preferably about 2–7 mm, more preferably 3–6 mm. In the adhesion to the surface of the small agglomerates, the adhesion quantity is desirably set to 1–10 mass % to the small agglomerates, more preferably 3–7 mass %.

Since the granular metallic iron obtained according to the above method hardly contains the slag component and has an extremely high Fe purity since the coagulation is performed while eliminating the by-produced slag. This metallic iron is sent to an exhibiting steel making apparatus such as electric furnace or converter, and used as iron source. To use it as steel making raw material, the content of sulfur (S) is desirably reduced as much as possible. Therefore, as the result of studies to provide low-S metallic iron by removing the S-component contained in the iron ore or carbonaceous material in the above producing process of metallic iron, it was confirmed that a CaO source (including slaked lime and calcium carbonate in addition to quick lime) is positively mixed to the raw material in the production of the small mass by mixing iron ore to the carbonaceous material to regulate the compositions so that the basicity (or $CaO/SiO_2$ ratio) of the total slag forming component contained in the raw material small mass, taking the slag forming component such as gangue component contained in iron ore into account is 0.6–1.8, more preferably 0.9–1.5, whereby the S content in the finally obtained metallic iron can be reduced to 0.10% or less, further to about 0.05% or less.

The coke or coal most generally used as the carbonaceous reducing agent generally contains about 0.2–1.0% S, and most of S is taken into the metallic iron. On the other hand, when the basicity regulation by the positive addition of the CaO source is not performed, the basicity calculated from the slag forming component contained in the raw material mass is 0.3 or less in most cases although it is rather varied depending on the brand of iron ore. In such a low-basicity slag, the inclusion (vulcanization) of S to metallic iron is unavoidable in the following melting and coagulation process, and about 85% of the total S contained in the raw material mass is taken into the metallic iron. Consequently, the S quantity in the metallic iron is as high as 0.1–0.2% to damage the quality as granular metallic iron.

However, the composition of the slag forming component is regulated so as to have a basicity within the range of 0.6–1.8 by the positive addition of the CaO source in the producing process of the raw material mass as described above, whereby S is fixed into the slag by-produced in the reduction and in the carburization, melting and coagulation, and the S quantity in the granular metallic iron can be consequently significantly reduced to, for example, the level of 0.05–0.08%. The mechanism of reducing S is conceivably that the S contained in the raw material mass is reacted with CaO ($CaO+S \rightarrow CaS$) and fixed as CaS.

EXAMPLE 1

Figure 2:
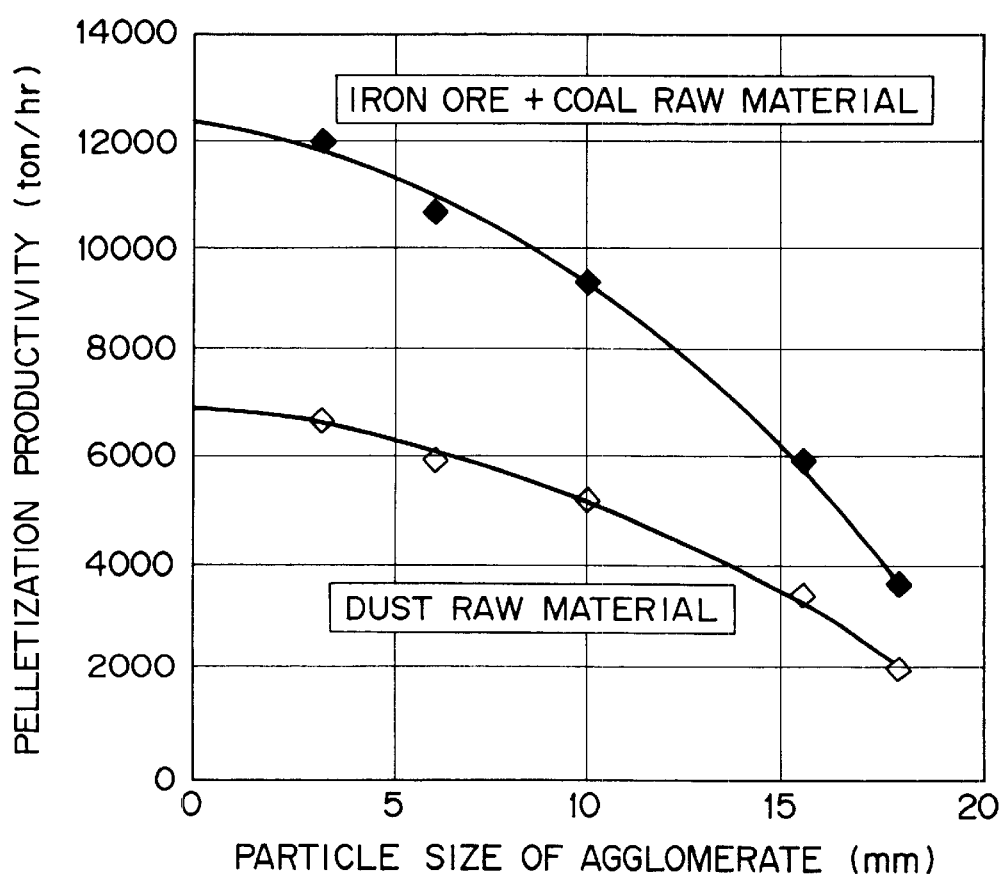
FIG. 2 is a graph showing the relation between the particle size of a raw material agglomerate and the pelletization productivity.

Two kinds of mixtures were used as raw materials, and each mixture was palletized to several kinds of agglomerates differed in particle size by use of a pan pelletizing machine, and the productivities of pellets within the range of ±10% of an intended particle size for the respective cases were compared to each other. The result is shown in FIG. 2.

Raw Material 1

Iron oxide source (iron ore) composition: T. Fe; 68.8%, $SiO_2$; 2.1%, $Al_2O_3$; 0.6%, particle size; 75 μm or less Carbonaceous (coal powder) composition: fixed carbon; 72.2%, volatile content; 18.4%, ash content; 9.4%, particle size; 75 μm or less Mixing ratio of iron ore/coal powder/binder: 78.3%/20%/1.7%.

Raw Material 2

Iron oxide source and carbonaceous material (blast furnace dust) composition: T. Fe; 38.02%, $SiO_2$; 2.51%, $Al_2O_3$; 1.03%, fixed carbon; 14.57%, particle size; 75 μm or less.

Mixing ratio of blast furnace dust/binder: 98%/2%.

As is apparent from FIG. 2, the absolute value of pelletization productivity is rather varied depending on the kind of raw materials. In both cases, the larger the intended particle size of pellets is, the lower the pelletization productivity is. When the intended particle size exceeds 10 mm, particularly, the pelletization productivity is remarkably deteriorated. When the intended particle size is 10 mm or less, particularly less than 6 mm, high pelletization productivity can be stably provided. Namely, high productivity can be obtained in a small size agglomerate with a particle size of 10 mm or less, more preferably less than 6 mm regulated in this invention, compared with a large size agglomerate generally used in the past, and this advantage is effectively exhibited in the production process of the raw material agglomerate.

EXAMPLE 2

For two kinds of agglomerates of particles sizes of 5 mm and 18 mm produced by use of the same material as the raw material 1 of Example 1, undried bodies and dried bodies were prepared, respectively. Each was charged in an experimental furnace, and the temperature was raised to 1350° C. at a temperature rising speed of 1350° C./min to compare the presence of rupture. For the judgment of rupture, when the agglomerate was partially ruptured in the heating within the furnace and could not keep half or more of the spherical form, the presence of rupture was judged.

The result is as follows. Both the agglomerates with particle sizes of 5 mm and 18 mm were not ruptured in the form of dried body, but the difference by particle size remarkably appears in the form of undried body with rupture of 90% of the large size agglomerates of 18 mm against no rupture of the agglomerates of 5 mm, and has a remarkable bad effect on reduction.

Agglomerate particle size: 5 mm

Dried agglomerate (number of ruptures/number of test) 0/10

Undried agglomerate (number of ruptures/number of test) 0/10

Agglomerate particle size: 18 mm

Dried agglomerate (number of ruptures/number of test) 0/10

Undried agglomerate (number of ruptures/number of test) 9/10

EXAMPLE 3

The dust used as the Raw Material 2 in the above example was used to produce agglomerates of various particle sizes.

For each agglomerate, a reduction experiment (the sample agglomerate is charged in a refractory-made flat tray) was performed by use of an experimental furnace (box type electric furnace) to examine the effect on productivity of the particle size of the agglomerate and the number of layers (1–5 layers) in the furnace. The productivity was judged according to the reduction time required until the reduction rate of each sample agglomerate reaches 90%. Reduction conditions of nitrogen atmosphere and a temperature of about 1300° C. were adapted in all cases of this experiment.

Figure 3:
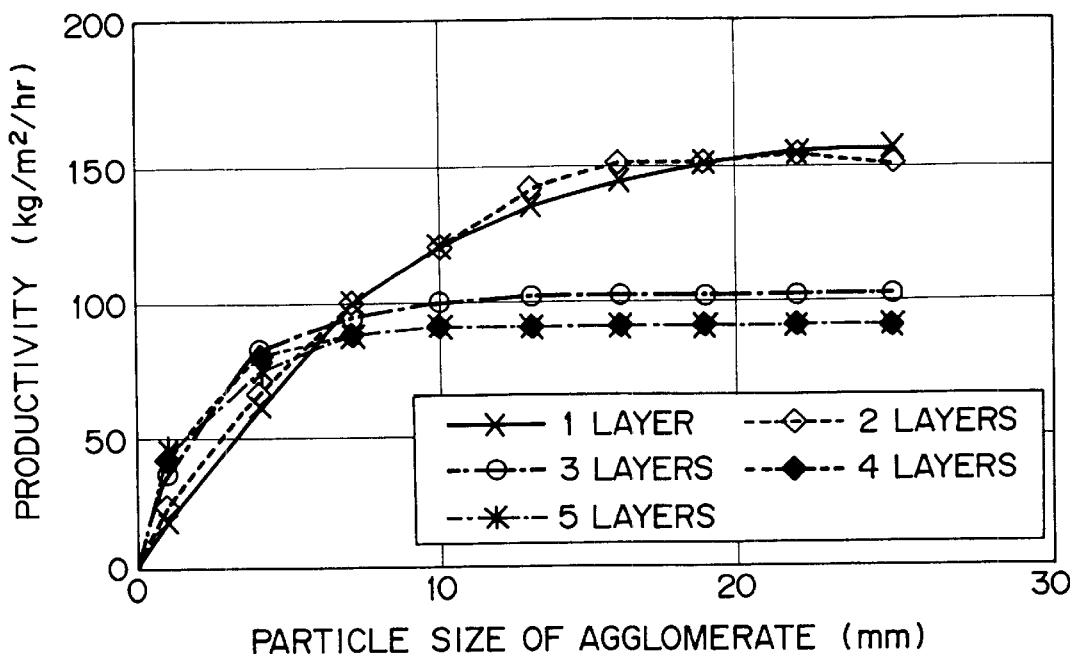
FIG. 3 is a graph showing the influence on productivity of the change of the number of layers of the raw material agglomerate every particle size.
Figure 4:
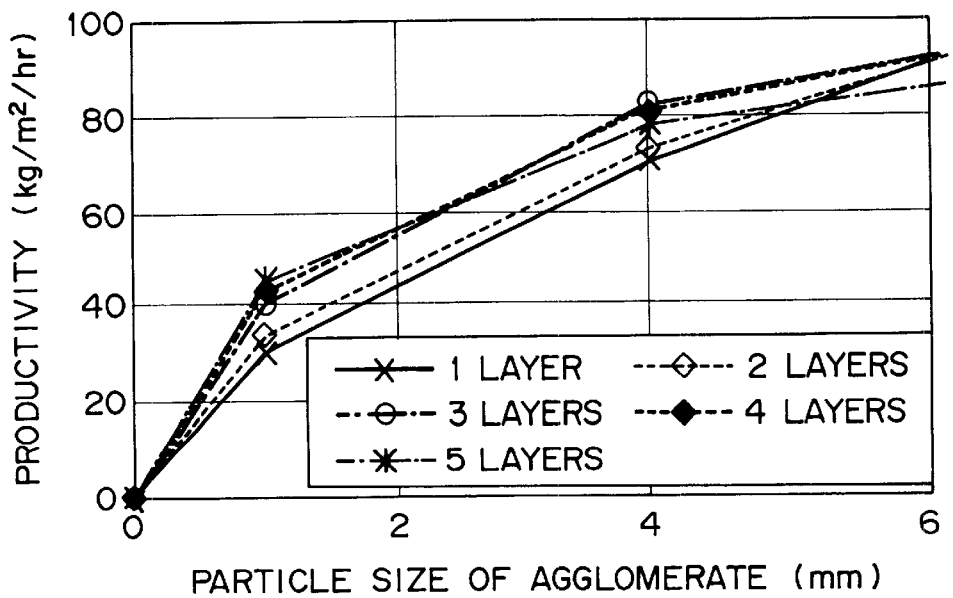
FIG. 4 is an enlarged graph of the small particle size side of 6 mm or less in FIG. 3.

The results are shown in FIGS. 3 and 4. The influence against the productivity of the layer thickness of the agglomerate having a particle size exceeding 6 mm is divided to a group having a layer thickness of 1 or 2 layers and a group having a layer thickness of 3–5 layers. Since the agglomerate sufficiently receives the radiation heat to rapidly heat the whole layer in the 1 or 2-layer thickness, the productivity is improved more as the particle size of each agglomerate is larger. In contrast to this, the productivity is the limit state as the whole in the 3-layer thickness or more since the transfer of the radiation heat to the agglomerate on the lower layer side is delayed. Namely, although the influence by the insufficient heat transfer to the lower layer side by the multilayer charge remarkably appears in a particle size of the raw material agglomerate of 6 mm or more, particularly exceeding 10 mm to obstruct the improvement in productivity, the particle size of the raw material agglomerate is controlled to 10 mm or less, whereby the productivity can be apparently enhanced by the increase in weight of the raw material agglomerate accompanying the increase in number of layers (FIG. 3).

When a agglomerate particularly having a particle size less than 6 mm is used (FIG. 4), the group having the larger layer thickness of 3–5 layers apparently shows the higher productivity than the group having the layer thickness of 1–2 layers. Namely, it can be confirmed from this that to set the particle size of the agglomerate to less than 6 mm is extremely effective to more efficiently enhance the productivity by the increase in weight of the raw material agglomerate by the increase in number of layers. The reason for this is conceivably that the smaller particle size of the agglomerate leads to an increase in charging density of the raw material charge layer to compensate the difference in heat transfer speed, so that the temperature can be rapidly raised to the lower layer part. Accordingly, when the small size agglomerate is used, the charging quantity per unit hearth area can be increased by the increase in number of layers to enhance the productivity.

Further, agglomerates differed in particle size were laminated in 1–5 layers in the same method as described above, and the heat reduction examination was performed to measure the necessary time from heating start until the metallization rate of each agglomerate reaches 90%, whereby the optimum layer thickness according to the particle size of the agglomerate was examined. Consequently, it was confirmed that the optimum thickness is 1.1 layer in a agglomerate of a particle size of 10 mm, 2.0 layers in a particle size of 8 mm, 1.7 layers in a particle size of 6 mm, 2.7 layers in a particle size of 4 mm, 3.2 layers in a particle size of 3 mm, and 4.3 layers in a particle size of 2 mm.

Figure 5:
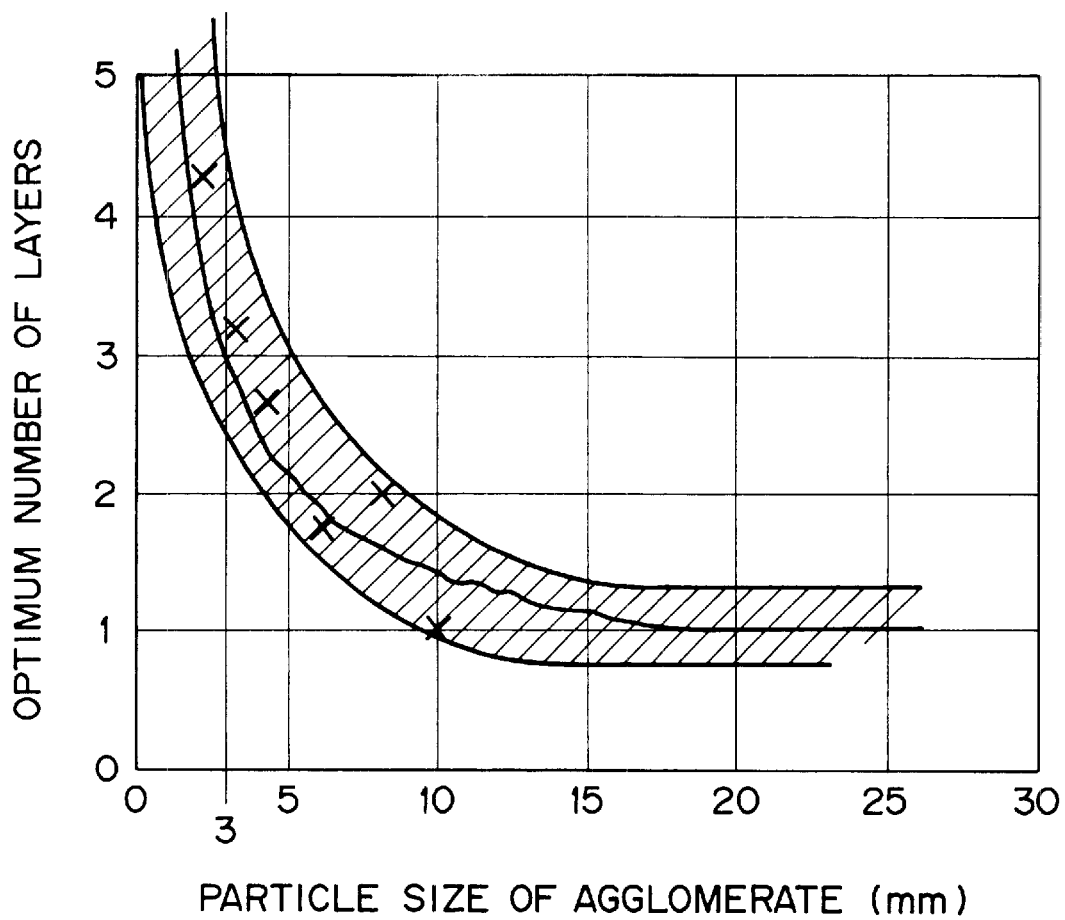
FIG. 5 is a graph showing the relation of the optimum number of layers according to the particle size of the raw material agglomerate.

FIG. 5 shows the graph of the result of the above experiment. When the dispersion of characteristics or productivity of practical furnaces, the optimum number of layers according to the particle size of the agglomerate is set within the range shown by the slant line of FIG. 5, whereby the productivity per unit hearth area can be effectively enhanced. As is also apparent from the graph, when the particle size of the agglomerate is set to 10 mm or less, more preferably to less than 6 mm, particularly within the range of 2–5 mm, the optimum number of layers can be increased to effectively enhance the productivity per unit hearth area.

When the LOAD ($kg/m^2$) in the expression described before with the particle size of the agglomerate D (m), the following expression can be obtained.

$$\text{LOAD } (kg/m^2) = \text{Apparent density } (kg/m^3)(((4/3)\cdot\pi(D/2)^3)(m^3) \div D^2))$$

Since the LOAD is substantially determined according to the particle size (D) of the agglomerate, the proper number of layers (H) can be determined according to the particle size (D) of the raw material agglomerate as shown in FIG. 5. The diameter is adapted as the particle size when the particle size of the raw material agglomerate is substantially uniform, and the weight average or the average diameter converted to sphere can be adapted when the particle size is not uniform or the shape is also uneven as briquette.

In addition, the optimum number of layers can be increased to effectively enhance the productivity per unit hearth area of granular metallic iron to produce by melting and coagulating.

EXAMPLE 4

Iron ore (essential components: T. Fe; 69.2%, $Al_2O_3$; 0.51%, $SiO_2$; 1.81%) as iron source, coal powder (essential components: fixed carbon; 71.6%, ash content; 8.8%, volatile content; 19.6%) as carbonaceous reducing agent, and quick lime as binder were used, these were uniformly mixed in a mass ratio of 78.54:20.46:1.00, and stirred for about 15 minutes by use of a mixer while spraying water, whereby a pseudo granular small agglomerates (water content: 12.9%) was obtained. These small agglomerates were dried so as to have a moisture content of about 6%, and separated by sieving to four particle size groups of 1.0 mm or less, 1.0–3.35 mm, 3.35–5.6 mm, and 5.6–6.7 mm.

The pseudo granular carbonaceous particles are closely laid over the bottom surface of a refractory-made flat tray, and each of the sieved small agglomerates was charged in layer so as to have a height of about 12 mm. This was put in a small electric furnace and heated at 1440° C. for 12 minutes (for 15 minutes in the use of those having a particle size less than 1 mm) while carrying 100% nitrogen gas to reduce and melt it, whereby granular metallic iron was experimentally produced. The average value of apparent density of the resulting granular metallic iron and the Fe yield of the granular metallic iron having a particle size of 3 mm or more were shown in FIG. 9. For comparison, the production of granular metallic iron was performed in the same manner as the above method except setting the average particle size of the agglomerates to 18.5 mm and changing the heating condition to 1430° C.×12 minutes. The result is also shown in the same figure.

In the production of granular metallic iron by heating and reducing the agglomerate containing the iron oxide source and the carbonaceous reducing agent, generally, it is supposed that the larger granular metallic iron can be obtained as the size of the raw material agglomerate is larger. In the above experiment, also, it is recognized that the particle size of the resulting granular metallic iron tends to relatively increase as the particle size of the raw material agglomerate is increased. However, this tendency is slight, and even if the small agglomerate having a particle size of about 3–7 mm preferably used in this invention is used as the raw material, the particle size of the resulting granular iron is hardly different from the particle size of the granular iron obtained in the use of the agglomerate having a general particle size of about 18 mm. Thus, according to this invention, the above-mentioned advantage by using the small agglomerates can be effectively enjoyed with hardly causing the deterioration in quality of the granular metallic iron.

In the above experiment, since coke powder was laid on the hearth, the produced granular metallic iron was entirely coagulated on the surface of the coke powder, and the corrosion of the tray was hardly observed in the bottom surface but slightly observed only in the side wall surface.

When the iron oxide source and carbonaceous reducing agent of the same composition as the above were used as the raw materials, and the heat reduction was performed under the same condition as the above except using the dry powders subjected to no agglomeratinging treatment. As the result, it was confirmed that no molten metallic iron was produced even if the heating temperature was raised to 1480° C. The reason for this is conceivably that the reduction was hardly progressed because the iron oxide source and the carbonaceous reducing agent were not in close contact to each other, and the iron oxide could not be reduced to metallic iron in the level of 1440° C.

EXAMPLE 5

The iron ore (the same as in Example 4) as iron source and coke powder (the same as in Example 4) as carbonaceous reducing agent were used, the both were uniformly mixed in a ratio of 79.3%: 20.7% (mass %), and 10% water was then added thereto to perform the pelletization by use of a pan pelletizing machine, whereby small agglomerates having particle sizes of 3–5 mm were produced. The small agglomerates were charged in a refractory-made flat tray in a thickness of about 30 mm without drying, three ridges 20 mm or 30 mm in height were formed on the surface at intervals of a width of about 30 mm, and the resulting tray was charged in a box type electric furnace and heated at 1425° C. for 12 minutes, whereby the reduction and the melting and coagulation were performed. As the result of comparison for the production state of granular metallic iron (yield of granular metallic iron 3.35 mm or more in diameter), the yield of granular metallic iron 3.35 mm or more in diameter was 93.0% in the ridge height of 20 mm, and 94.7% in the ridge height of 30 mm.

When the flowing state of the molten metallic iron produced by the heating after reduction was observed through an observation window in the above experiment, the phenomenon that the molten metallic iron produced in the ridge top part flows down along the valley and coagulates and granulates in the valley bottom part was observed. It was confirmed that the particle size of the resulting granular metallic iron is larger as the ridge height is larger. However, when the ridge space is too wide, the above coagulation effect can be hardly effectively exhibited. It was confirmed that the granular metallic iron having a particle size of about 3 mm or more can effectively be produced with a ridge space of set about 10 mm.

We claim:

1. A method for producing reduced iron, the method comprising
    agglomerating a raw material mixture containing a carbonaceous reducing agent and an iron oxide-containing material into small agglomerates;
    charging the small agglomerates into a reduction furnace;
    heating the small agglomerates in the reduction furnace; and
    solid reducing iron oxide in the small agglomerates to produce solid reduced iron, wherein
    60 mass % or more of the small agglomerates have a particle size in a range of from 3 mm to less than 6 mm.

2. The method according to claim 1, wherein the small agglomerates are charged onto a hearth of the reduction furnace in 2–5 layers.

3. The method according to claim 1, wherein the small agglomerates are charged onto a hearth of the reduction furnace so as to mutually overlap in a thickness of 10–30 mm.

4. The method according to claim 1, wherein the small agglomerates are charged onto a hearth of the reduction furnace in 3–5 layers.

5. The method according to claim 1, wherein the small agglomerates are charged into the reduction furnace without drying.

6. The method according to claim 1, wherein the small agglomerates are charged onto a hearth of the reduction furnace after drying at least a surface of the small agglomerates.

7. The method according to claim 1, wherein
    the small agglomerates are charged onto a hearth of the reduction furnace to form a small agglomerate layer; and
    the method further comprises forming mountain parts and valley parts in the small agglomerate layer.

8. The method according to claim 1, wherein the small agglomerates are charged into the reduction furnace after laying a powdery carbonaceous material onto a hearth of the reduction furnace.

9. The method according to claim 1, wherein the small agglomerates are charged onto a hearth of the reduction furnace with a carbonaceous powder adhered to a surface of the small agglomerates.

10. The method according to claim 1, wherein the reduction furnace is a rotary hearth furnace.

11. The method according to claim 1, wherein
    the small agglomerates are charged into the reduction furnace, and
    a surface temperature of the small agglomerates is then raised to 1200° C. or higher in ⅓ of a total reduction time.

12. The method according to claim 1, further comprising
    heating the solid reduced iron within the reduction furnace;
    melting metallic iron produced in the solid reduced iron; and
    coagulating the molten metallic iron while separating a slag component contained in the small agglomerates to provide granular metallic iron.

13. The method according to claim 12, wherein the small agglomerates are charged onto a hearth of the reduction furnace so as to mutually overlap in a thickness of 10–30 mm.

14. The method according to claim 12, wherein the small agglomerates are charged onto a hearth of the reduction furnace in 3–5 layer.

15. The method according to claim 12, wherein the small agglomerates are charged into the reduction furnace without drying.

16. The method according to claim 12, wherein the small agglomerates are charged onto a hearth of the reduction furnace after drying at least a surface of the small agglomerates.

17. The method according to claim 12, wherein
    the small agglomerates are charged onto a hearth of the reduction furnace to form a small agglomerate layer; and the method further comprises forming mountain parts arid valley parts in the small agglomerate layer.

18. The method according to claim 12, wherein the small agglomerates are charged after laying a powdery carbonaceous material onto a hearth of the reduction furnace.

19. The method according to claim 12, wherein the reduction furnace is a rotary hearth furnace.

20. The method according to claim 12, wherein
the small agglomerates are charged into the reduction furnace, and
a surface temperature of the small agglomerates is then raised to 1200° C. or higher in ⅓ of a total reduction time.

21. A method for producing reduced iron, the method comprising
agglomerating small agglomerates of particle sizes of 10 mm or less containing a carbonaceous reducing agent and an iron oxide-containing material;
charging the small agglomerates onto a hearth of a reduction furnace so as to form a number of layers of the small agglomerates obtained from an operation condition;
heating the small agglomerates within the reduction furnace; and
solid reducing iron oxide in the small agglomerates to produce solid reduced iron, wherein
the operation condition is given by the following expression:

$$H=Z\{X(G/P)\}/\{A(AD)(\pi/6)(D/T)\}$$

where
H is the number of layers of the small agglomerates on the hearth,
Z is a positive number ranging from 0.7 to 1.3,
X is a productivity (kg/min) of the reduction furnace,
G/P is a mass ratio of the small agglomerates charged onto the hearth to the solid reduced iron produced,
A is an area (m$^2$) of the hearth on which the small agglomerates are charged,
AD is an apparent density (kg/m$^3$) of the small agglomerates,
D is a particle size of the small agglomerates (m), and
T is a production time (min).

22. The method according to claim 21, wherein
the particle sizes of the small agglomerates are in a range of 6–10 mm, and
the small agglomerates are charged on the hearth of the reduction furnace in 1–3 layers.

23. The method according to claim 21, wherein a particle size distribution of the small agglomerates is within a range of 6 mm.

24. The method according to claim 21, wherein
the small agglomerates are charged into the reduction furnace, and
a surface temperature of the small agglomerates is then raised to 1200° C. or higher in ⅓ of a total reduction time.

25. The method according to claim 21, further comprising
heating the solid reduced iron within the reduction furnace;
melting metallic iron produced in the solid reduced iron; and
coagulating the molten metallic iron while separating a lag component contained in the small agglomerates to provide granular metallic iron.

26. The method according to claim 21, wherein the small agglomerates are charged on the hearth of the reduction furnace in 3–5 layers.

27. The method according to claim 21, wherein
the small agglomerates are charged onto the hearth of the reduction furnace to form a small agglomerate layer; and
the method further comprises forming mountain parts and valley parts in the small agglomerate layer.

28. The method according to claim 21, wherein the small agglomerates are charged onto the hearth with a carbonaceous powder adhered to a surface of the small agglomerates.

29. The method according to claim 21, wherein the reduction furnace is a rotary hearth furnace.

30. A method for producing reduced iron, the method comprising
agglomerating a raw material mixture containing a carbonaceous reducing agent and an iron oxide-containing material;
heating the agglomerate within a heating reduction furnace; and
solid reducing iron oxide in the agglomerate to produce solid reduced iron, wherein
the agglomerate of the raw material mixture has a particle size in a range of from 3 mm to less than 6 mm.

31. A method for producing granular metallic iron, the method comprising.
agglomerating a raw material mixture containing a carbonaceous reducing agent and an iron oxide-containing material into small agglomerates;
heating the small agglomerates in a reduction melting furnace to solid reduce iron oxide in the small agglomerates;
melting metallic iron produced by the reduction; and
coagulating the molten metallic iron while separating a slag component contained in the small agglomerates to provide granular metallic iron, wherein
60 mass % or more of the small agglomerates have a particle size in a range of from 3 mm to less than 6 mm.

* * * * *